United States Patent
Hisamura

(10) Patent No.: US 7,486,410 B2
(45) Date of Patent: Feb. 3, 2009

(54) IMAGE FORMING APPARATUS, IMAGE FORMING METHOD AND STORAGE MEDIUM

(75) Inventor: Toshio Hisamura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 772 days.

(21) Appl. No.: 10/953,528

(22) Filed: Sep. 30, 2004

(65) Prior Publication Data

US 2005/0151985 A1 Jul. 14, 2005

(30) Foreign Application Priority Data

Jan. 14, 2004 (JP) ............................. 2004-006519

(51) Int. Cl.
G06K 15/16 (2006.01)
H04N 1/50 (2006.01)
B41F 13/58 (2006.01)
B41F 13/66 (2006.01)
B42C 1/00 (2006.01)

(52) U.S. Cl. .................... 358/1.12; 358/504; 270/52.14; 270/52.18; 270/4; 399/407; 399/410; 399/72; 399/408

(58) Field of Classification Search ................ 358/1.9, 358/1.14, 406, 1.12, 504; 399/9, 72, 77, 399/11, 81–82, 87, 407, 410, 408; 270/37, 270/288, 58.01, 58.02, 52.14, 52.18, 4; 271/287–288, 271/298

See application file for complete search history.

(56) References Cited

U.S. PATENT DOCUMENTS

| | | | | |
|---|---|---|---|---|
| 5,461,469 | A * | 10/1995 | Farrell et al. | 399/407 |
| 6,175,700 | B1 * | 1/2001 | Miller et al. | 399/72 |
| 6,178,007 | B1 | 1/2001 | Harrington | |
| 2002/0180822 | A1 | 12/2002 | Aritomi | |
| 2004/0136025 | A1 * | 7/2004 | Moriyama et al. | 358/1.14 |

FOREIGN PATENT DOCUMENTS

| CN | 1383058 A | 12/2002 |
|---|---|---|
| JP | B2 3150305 | 1/2001 |

* cited by examiner

*Primary Examiner*—Edward L. Coles
*Assistant Examiner*—Charlotte M Baker
(74) *Attorney, Agent, or Firm*—Oliff & Berridge, PLC

(57) ABSTRACT

An image forming apparatus includes an image forming unit which forms an image on a recording medium, a post-processing unit which performs a post-processing on the recording medium on which the image is formed by the image forming unit, and a post-processing controller which controls the post-processing unit according to whether an image requested by a user or a test image is formed on the recording medium. An image forming method includes, in a case where the requested image and the test image are formed on plural recording media, controlling the post-processing according to whether the requested image or the test image is formed on the recording medium, and according to the control, performing the post-processing on the recording medium on which the requested image or the test image is formed.

25 Claims, 12 Drawing Sheets

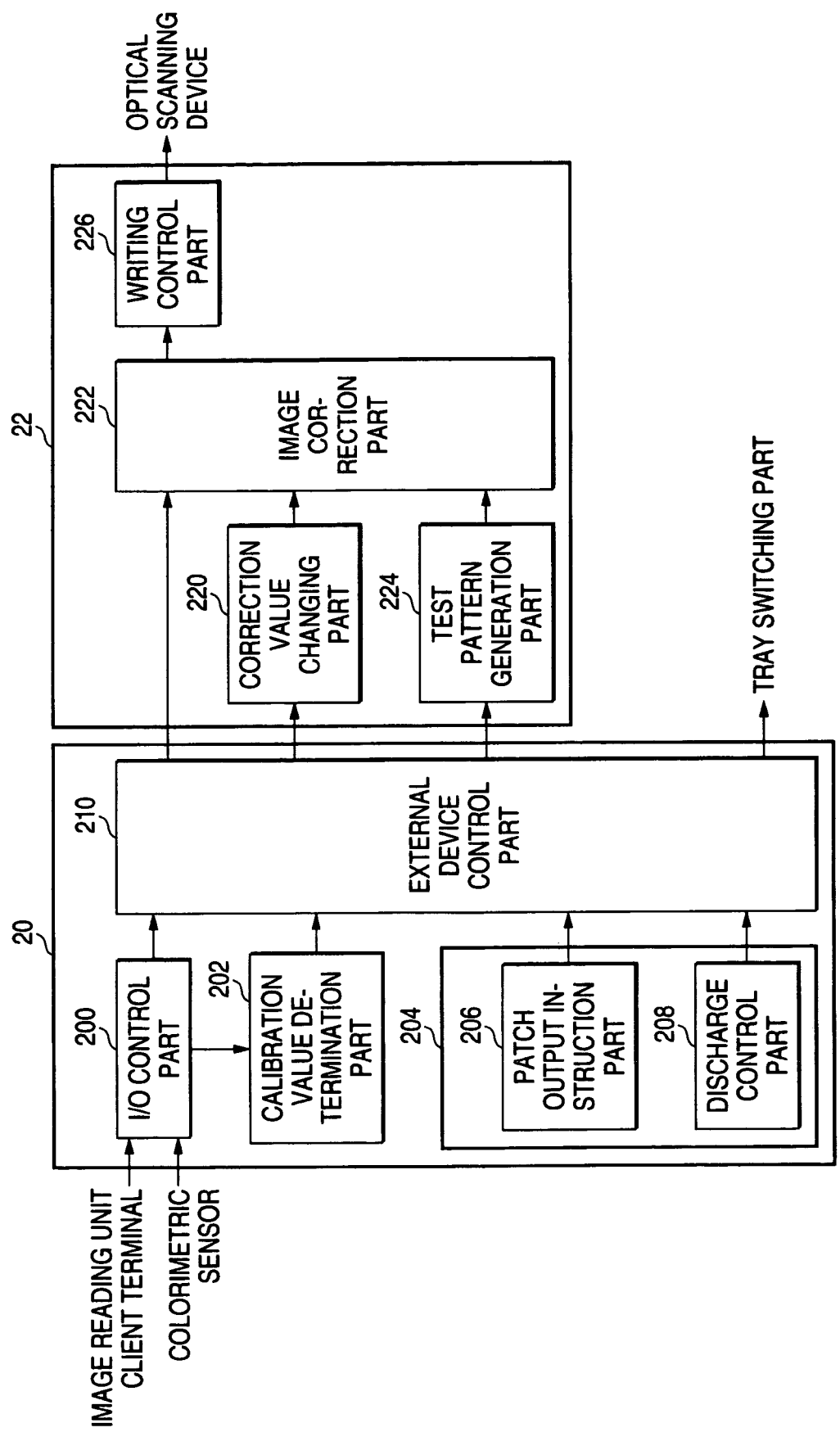

FIG. 3A

| JOB 1 (FIRST PART) | TRAY 1 |
| --- | --- |
| | IMAGE DATA (THICK PAPER) #01 (ONE SHEET) |
| JOB 2 (FIRST PART) | TRAY 1 |
| | IMAGE DATA (COAT) #02 TO #09 (EACH ONE SHEET) |
| JOB 3 (FIRST PART) | TRAY 1 |
| | IMAGE DATA (PLAIN PAPER) #10 TO #50 (EACH ONE SHEET) |
| JOB 4 (FIRST PART) | TRAY 1 |
| | IMAGE DATA (THICK PAPER) #51 (ONE SHEET) |
| JOB 5 (SECOND PART) | TRAY 1 |
| | IMAGE DATA (THICK PAPER) #01 (ONE SHEET) |
| JOB 6 (SECOND PART) | TRAY 1 |
| | IMAGE DATA (COAT) #02 TO #09 (EACH ONE SHEET) |
| JOB 7 (SECOND PART) | TRAY 1 |
| | IMAGE DATA (PLAIN PAPER) #10 TO #50 (EACH ONE SHEET) |
| JOB 8 (SECOND PART) | TRAY 1 |
| | IMAGE DATA (THIHCK PAPER) #51 (ONE SHEET) |

FIG. 3B

| JOB 3.1 | SCREEN A |
| --- | --- |
| | IMAGE DATA #10 TO #20 (EACH ONE SHEET) |
| JOB 3.2 | SCREEN A SCREEN B |
| | IMAGE DATA #21 TO #23 (EACH ONE SHEET) |
| JOB 3.3 | SCREEN A |
| | IMAGE DATA #24 TO #50 (EACH ONE SHEET) |

FIG. 4

| | |
|---|---|
| JOB 3.2 (FIRST PART) | TRAY 1 |
| | IMAGE DATA (A, B) #21 TO #23 (EACH ONE SHEET) |
| JOB 3.3 (FIRST PART) | TRAY 1 |
| | IMAGE DATA (A) #24 TO #50 (EACH ONE SHEET) |
| JOB 4 (FIRST PART) | TRAY 1 |
| | IMAGE DATA (A) #51 (ONE SHEET) |
| CALIBRATION JOB | TRAY 2 |
| | TEST IMAGE #0012 (A) |
| JOB 5 (SECOND PART) | TRAY 11 |
| | IMAGE DATA (A) #01 (ONE SHEET) |
| JOB 6 (SECOND PART) | TRAY 1 |
| | IMAGE DATA (A) #02 TO #09 (EACH ONE SHEET) |

FIG. 5

| SHEET | SCREEN | TEST IMAGE | DIFFERENTIAL DATA | CALIBRATION VALUE |
|---|---|---|---|---|
| SHEET 1 | SCREEN A | NO. 0012 | AAA-BBB | +aaa |
| | | | BBB-CCC | +bbb |
| | | | ... | ... |
| SHEET 2 | SCREEN A | NO. 0014 | AAA-BBB | +fff |
| | | | BBB-CCC | +ggg |
| ⋮ | ⋮ | ⋮ | ⋮ | ⋮ |

FIG. 11

| | |
|---|---|
| JOB 3.2 (FIRST PART) | STAPLE #1 |
| | IMAGE DATA #21 TO #23 (EACH ONE SHEET) |
| JOB 3.3 (FIRST PART) | STAPLE #1 |
| | IMAGE DATA #24 TO #50 (EACH ONE SHEET) |
| JOB 4 (FIRST PART) | STAPLE #1 |
| | IMAGE DATA #51 (ONE SHEET) |
| CALIBRATION JOB | INHIBIT |
| | TEST IMAGE #0012 |
| JOB 5 (FIRST PART) | STAPLE #1 |
| | IMAGE DATA #52 (ONE SHEET) |
| JOB 6 (SECOND PART) | STAPLE #2 |
| | IMAGE DATA #01 TO #09 (EACH ONE SHEET) |

IMAGE FORMING APPARATUS, IMAGE FORMING METHOD AND STORAGE MEDIUM

BACKGROUND OF THE INVENTION

1. Field of the Invention

The present invention relates to an image forming apparatus, image forming method and a storage medium storing a program for performing an image forming function, which include a color calibration processing.

2. Description of the Related Art

It is known to provide an image processing method in which in a case where it is necessary to perform a calibration during continuous formation of n sheets of images, an image forming processing is suspended, a calibration processing is performed, and after the calibration processing is ended, the image forming processing is resumed.

SUMMARY OF THE INVENTION

The present invention provides an image forming apparatus, image forming method and a storage medium storing a program for performing an image forming function, which facilitate handling of a recording medium on which a test image is formed.

According to an aspect of the present invention, an image forming apparatus includes an image forming unit that forms an image on a recording medium, a post-processing unit that performs a post-processing on the recording medium on which the image is formed by the image forming unit, and a post-processing controller that controls the post-processing unit according to whether an image requested by a user is formed on the recording medium or a test image is formed on the recording medium.

According to another aspect of the present invention, an image forming apparatus includes an interrupt unit that interrupts a continuous formation of plural images requested by a user on plural recording media with formation of a test image including a test pattern on a recording medium, and an interrupt controller that allows or inhibits an interrupt of the test image formation by the interrupt unit according to whether the recording medium on which the requested image is formed and the recording medium on which the test image is formed can be discharged to positions different from each other.

According to another aspect of the invention, an image forming method includes, in a case where an image requested by a user and a test image including a test pattern are continuously formed on plural recording media, instructing post-processings different from each other according to whether the requested image is formed on the recording medium or the test image is formed on the recording medium, and performing the instructed post-processing on the recording medium on which the requested image or the test image is formed.

According to another aspect of the present invention, a computer-readable storage medium stores a program which causes a computer of an image forming apparatus to carry out an image forming method including, in a case where an image requested by a user and a test image including a test pattern are continuously formed on plural recording media, instructing post-processings different from each other according to whether the requested image is formed on the recording medium or the test image is formed on the recording medium, and performing the instructed post-processing on the recording medium on which the requested image or the test image is formed.

According to some aspects of the present invention, it is possible to facilitate the handling of the recording sheet on which the test image is formed.

BRIEF DESCRIPTION OF THE DRAWINGS

Embodiments of the present invention will be described in detail based on the following figures, wherein:

FIG. 2 is a view exemplifying a functional structure of a controller 20 and an image processing device 22;

FIGS. 3A and 3B are views exemplifying request jobs created by an external device control part 210, in which FIG. 3A exemplifies the request jobs divided according to the kind of recording sheet 42 used for printing, and FIG. 3B exemplifies the request jobs further divided according to the number of printing sheets and the kind of screen;

FIG. 4 is a view exemplifying job data in which a calibration job is inserted;

FIG. 5 is a view exemplifying a calibration table to which a calibration value determination part 202 refers when a calibration value is determined:

FIG. 11 is a view exemplifying job data (in which a calibration job is inserted) created in the second embodiment.

DETAILED DESCRIPTION OF THE INVENTION

Hereinafter, a first embodiment of the present invention will be described.

First, a printer apparatus 10 to which the first embodiment of the present invention is applied will be described.

Figure 1:
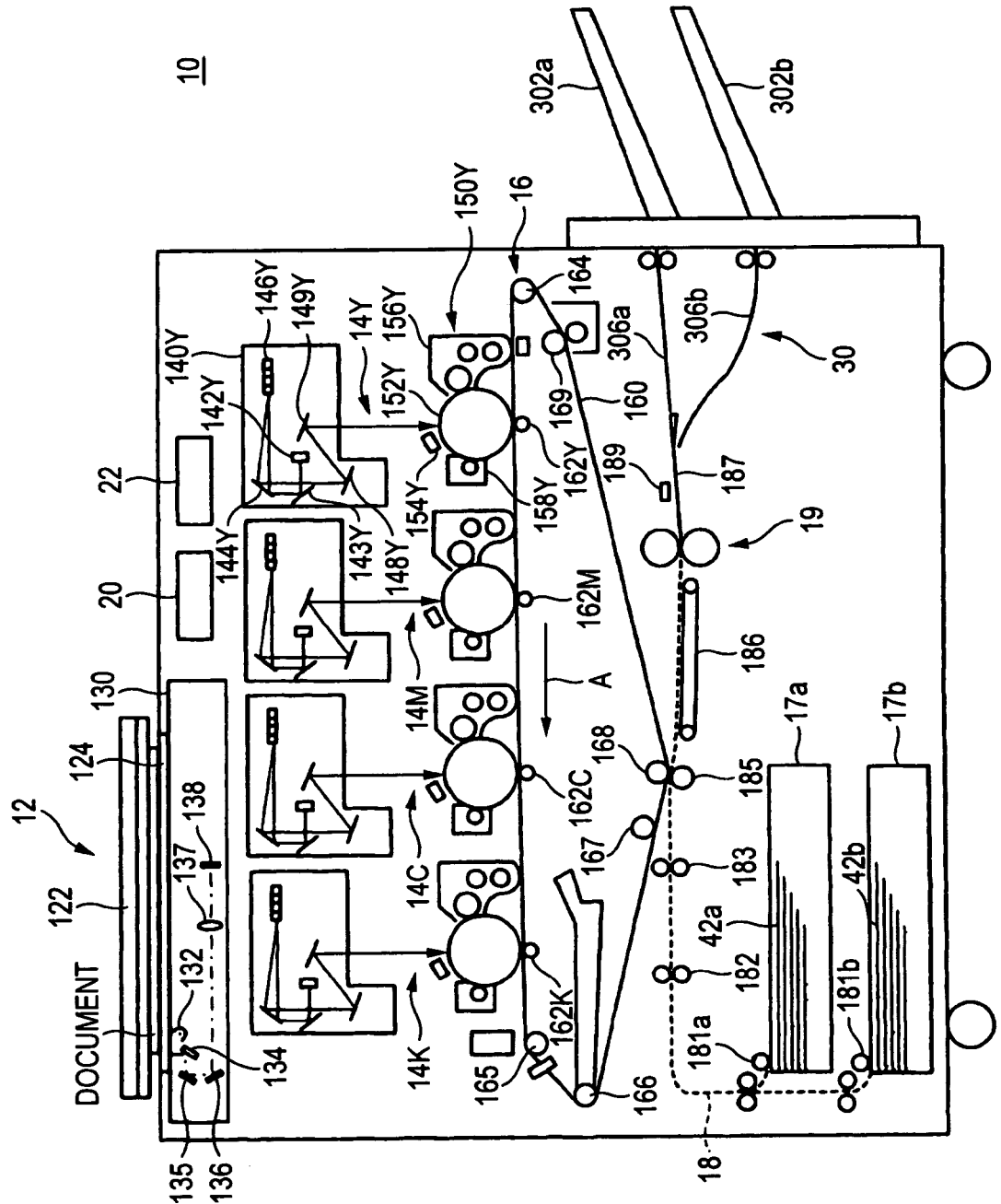
FIG. 1 is a view showing a structure of a tandem type printer apparatus (image forming apparatus) 10.

FIG. 1 is a view showing a structure of a tandem type printer apparatus (image forming apparatus) 10.

As shown in FIG. 1, the printer apparatus 10 includes an image reading unit 12, image forming units 14, an intermediate transfer device 16, plural sheet trays 17, a sheet transporting passage 18, a fixing unit 19, a controller 20 (post-processing control unit), an image processing device 22 and a post-processing device 30 (post-processing unit). This printer apparatus 10 may be a compound machine having a function as a full-color copying machine using the image reading device 12, and a function as a facsimile in addition to a printer function for printing image data received from a personal computer (not shown) or the like. In this embodiment, although a description will be given to, as a specific example, the tandem type printer apparatus 10 in which plural photosensitive drums 152 are provided, the invention is not limited to this, and for example, a printer apparatus may be provided with only one photosensitive drum 152.

First, the outline of the printer apparatus 10 will be described. The image reading device 12, the controller 20 and the image processing device 22 are disposed at the upper part of the printer apparatus 10. The image reading device 12 reads an image expressed on a document, and outputs it as image data to the controller 20. The controller 20 controls the respective components included in the printer apparatus 10. Besides, the controller 20 acquires image data inputted from the image reading device 12 or image data inputted from a personal computer (not shown) or the like through a network line such as a LAN, and outputs the acquired image data to the image processing device 22. The image processing device 22 performs an image processing, such as gradation correction and resolution correction, on the image data inputted from the controller 20, and outputs it to the image forming unit 14.

The plural image forming units 14 corresponding to colors constituting a color image are disposed below the image reading device 12. In this embodiment, a first image forming unit 14Y, a second image forming unit 14M, a third image forming unit 14C and a fourth image forming unit 14K corresponding to yellow (Y), magenta (M), cyan (C) and black (K) are horizontally disposed along the intermediate transfer device 16 at regular intervals. The intermediate transfer device 16 rotates an intermediate transfer belt 160 as an intermediate transfer body in a direction of an arrow A in the drawing. These four image forming units 14Y, 14M, 14C and 14K sequentially form toner images of the respective colors on the basis of the image data inputted from the image processing device 22, and transfer (primary transfer) them onto the intermediate transfer belt 160 at timings when these plural toner images are overlapped with each other. Incidentally, the order of the colors of the respective image forming units 14Y, 14M, 14C and 14K is not limited to the order of yellow (Y), magenta (M), cyan (C) and black (K), and the order is arbitrary, for example, the order may be black (K), yellow (Y), magenta (M) and cyan (C).

The sheet transporting passage 18 is disposed below the intermediate transfer device 16. A recording sheet 42a or 42b supplied from the first sheet tray 17a or the second sheet tray 17b is transported on the sheet transporting passage 18, toner images of the respective colors multiple-transferred on the intermediate transfer belt 160 are transferred (secondary transfer) at once, and the transferred toner images are fixed by the fixing unit 19. The post-processing device 30 is provided at the downstream side of the sheet transporting passage of the fixing unit 19, and discharges the recording sheet 42 subjected to the fixing processing to a first discharge tray 302a or a second discharge tray 302b.

Next, the respective components of the printer apparatus 10 will be described in detail.

As shown in FIG. 1, the image reading unit 12 includes a platen glass 124 on which a document is placed, a platen cover 122 for pressing this document onto the platen glass 124, and an image reading device 130 for reading an image of the document placed on the platen glass 124. This image reading device 130 is constructed such that the document placed on the platen glass 124 is illuminated by a light source 132, a reflected light image from the document is scan-exposed on an image reading element 138 made of CCDs or the like through a demagnification optical system including a full rate mirror 134, a first half rate mirror 135, a second half rate mirror 136, and an imaging lens 137, and the coloring material reflected light image of the document is read at a specified dot density (for example, 16 dots/mm) by the image reading element 138.

In accordance with a print request inputted by the user, the controller 20 sets the operation modes of the respective components (the image forming unit 14, the intermediate transfer device 16, the sheet tray 17, the sheet transporting passage 18, the fixing device 19, the image processing device 22, the post-processing device 30, etc.), and causes a print processing of a requested image requested by the user to be performed.

The image processing device 22 performs a specified image processing, such as shading correction, position shift correction of documents, brightness/color space conversion, gamma correction, frame deletion and color/movement edition, on the image data inputted through the controller 20. The coloring material reflected light image of the document read by the image reading unit 12 is, for example, document reflectivity data of three colors of red (R), green (G) and blue (B) (each 8 bits), and is converted into document color material gradation data (raster data) of four colors of yellow (Y), magenta (M), cyan (C) and black (K) (each 8 bits) by the image processing of the image processing device 22.

The first image forming unit 14Y, the second image forming unit 14M, the third image forming unit 14C and the fourth image forming unit 14K are horizontally disposed in parallel to each other at regular intervals, and are constructed substantially similarly to each other except the color of an image to be formed. Then, the first image forming unit 14Y will be described below. The structure of each of the image forming units 14 is differentiated by attaching Y, M, C or K.

The image forming unit 14Y includes an optical scanning device 140Y for scanning a laser beam according to the image data inputted from the image processing device 22, and an image forming device 150Y on which an electrostatic latent image is formed by the laser beam scanned by this optical scanning device 140Y.

The optical scanning device 140Y modulates a semiconductor laser 142Y according to the image data of yellow (Y), and a laser beam LB (Y) is emitted from this semiconductor laser 142 according to the image data. The laser beam LB (Y) emitted from this semiconductor laser 142Y is irradiated to a rotating polygonal mirror 146Y through a first reflecting mirror 143Y and a second reflecting mirror 144Y, is deflection-scanned by this rotating polygonal mirror 146Y, and is irradiated onto the photosensitive drum 152Y of the image forming device 150Y through the second reflecting mirror 144Y, a third reflecting mirror 148Y, and a fourth reflecting mirror 149Y.

The image forming device 150Y is constructed of the photosensitive drum 152Y as an image bearing body rotating along the direction of the arrow A at a specified rotation speed, a primary charging scorotron 154Y as a charging unit for uniformly charging the surface of this photosensitive drum 152Y, a developing unit 156Y for developing the electrostatic latent image formed on the photosensitive drum 154Y, and a cleaning device 158Y. The photosensitive drum 152Y is uniformly charged by the scorotron 154Y, and the electrostatic latent image is formed by the laser beam LB(Y) irradiated by the optical scanning device 140Y. The electrostatic latent image formed on the photosensitive drum 152Y is developed with the toner of yellow (Y), and is transferred to the intermediate transfer device 16. The residual toner, paper powder and the like attached to the photosensitive drum 152Y after the transfer process of the toner image are removed by the cleaning device 158Y.

The other image forming units 14M, 14C and 14K also form toner images of the respective colors of magenta (M), cyan (C) and black (K) similarly to the above, and the formed toner images of the respective colors are transferred to the intermediate transfer device 16.

The intermediate transfer device 16 includes the intermediate transfer belt 160 stretched over a drive roll 164, a first idle roll 165, a steering roll 166, a second idle roll 167, a backup roll 168, and a third idle roll 169 at a regular tension. The driver roll 164 is rotation-driven by a driving motor (not shown) so that this intermediate transfer belt 160 is circulation-driven in the direction of the arrow A at a specified speed. The intermediate transfer belt 160 is formed by forming, for example, a synthetic resin film having flexibility and made of polyimide or the like into a band shape, and connecting both ends of the synthetic resin film formed into the band shape by welding or the like.

The intermediate transfer device 16 includes a first primary roll 162Y, a second primary roll 162M, a third primary roll 162C and a fourth primary roll 162K at positions opposite to the respective image forming units 14Y, 14M, 14C and 14K, and the toner images of the respective colors formed on the photosensitive drums 152Y, 152M, 152C and 152K are multiple-transferred onto the intermediate transfer belt 160 by these primary transfer rolls 162. The residual toner attached to the intermediate transfer belt 160 is removed by a cleaning blade or brush of the cleaning device for the belt provided at the downstream side of the secondary transfer position.

On the sheet transporting passage 18, there are disposed a first sheet feeding roll 181a and a second sheet feeding roll 181b for extracting the first recording sheet 42a or the second recording sheet 42b from the first sheet tray 17a or the second sheet tray 17b, a roll pair 182 for sheet transport, and a registration roll 183 for transporting the recording sheet 42a or 42b to a secondary transfer position at a fixed timing (timing when synchronization with the toner image on the intermediate transfer belt 160 occurs).

A secondary transfer roll 185 coming in press contact with the backup roll 168 is disposed at the secondary transfer position on the sheet transporting passage 18, and the toner images of the respective colors multiple-transferred on the intermediate transfer belt 16 are secondarily transferred onto the recording sheet 42a or 42b by the contact pressure of the secondary transfer roll 185 and electrostatic force. The recording sheet 42a or 42b on which the toner images of the respective colors have been transferred is transported to the fixing unit 19 by two transporting belts 186.

The fixing unit 19 performs heat treatment and pressurization treatment on the recording sheet 42a or 42b on which the toner images of the respective colors have been transferred, so that the toner is melted and adheres to the recording sheet 42a or 42b.

The recording sheet 42a or 42b which is subjected to the fixing treatment (heating and pressurizing) by the fixing unit 19 passes through an discharge passage 187 (transporting passage) provided at the latter stage of the fixing unit 19 and is transported to the post-processing device 30. A colorimetric sensor 189 is provided in the discharge passage 187. The colorimetric sensor 189 is, for example, a colorimeter or a densitometer, reads the image on the recording sheet 42a or 42b, and measures the characteristic amount of this image. The characteristic amount measured by the colorimetric sensor 189 is, for example, chromogenic data (density, chroma, hue, color distribution, etc. of each color) indicating chromogenic characteristics.

The post-processing device 30 is a sorting device incorporated in the printer apparatus main body, and includes the plural discharge trays 302, a tray switching part 304 for switching the transport destination (discharge tray) of the recording sheet 42, and post-processing passages 306 connected to the respective discharge trays 302. The tray switching part 304 distributes the recording sheet 42 transported from the fixing unit 19 to the first post-processing passage 306a or the second post-processing passage 306b according to the control of the controller 20. The recording sheet 42 distributed by the tray switching part 304 passes through one of the post-processing passages 306 and is discharged to one of the discharge trays 302.

Next, the background in which the invention has been made and the outline of this embodiment will be described.

For example, there is a case where the printer apparatus 10 receives a print request to instruct the printing of plural images from the user. In such a case, the printer apparatus 10 performs continuous printing of the plural images according to the print request. As stated above, when the printer apparatus 10 performs the continuous printing of the plural images, the density of a printed image, the gradation reproducibility or the like is changed by the environmental change during the printing or the variation of apparatus characteristics, and the picture quality varies among the plural images printed by the same print request. Here, the "continuous printing" means that the printer apparatus 10 is not placed into a standby state but prints the plural images. It corresponds to, for example, a case where a request to print plural images is made, or a case where a next print request is made before the preceding print processing is completed.

When the printer apparatus 10 continuously prints the images, it is desirable that a test image including a test pattern is printed, and a color calibration processing is performed on the basis of this test image. Here, the color calibration processing is the processing for adjusting the printer apparatus 10 on the basis of the test image printed on the recording sheet 42, and includes, for example, a reading processing of the test image, a difference detection processing for detecting a difference between an apparatus characteristic as reference and a present apparatus characteristic, and a processing of determining an adjustment amount of the apparatus characteristic on the basis of the result of the difference detection processing.

It is also conceivable to perform a calibration processing during the continuous printing on the basis of a toner image formed on the photosensitive drum 152 or the intermediate transfer belt 160. However, the toner image formed on the photosensitive drum 152 has a single color, and it is difficult to estimate, on the basis of this, the color development in the case where the toners of plural colors are overlapped with each other. Besides, when the toner images are melted and adhere to the recording sheet 42, the characteristic of the surface of the recording sheet 42, the order of overlap of the toner images of the plural colors, the properties of the toners and the like are mutually related to one another, and the color development occurs. Thus, it is difficult to estimate the color development after the fixing and to perform a color calibration on the basis of the toner image formed on the intermediate transfer belt 160 or the like. Accordingly, in the printer apparatus 10 of this embodiment, it is desirable to perform the color calibration processing on the basis of the toner images of the plural colors formed on the recording sheet 42. More preferably, the image forming apparatus 10 performs the color calibration processing on the basis of the toner images fixed on the recording sheet 42.

As stated above, that the color calibration processing is inserted during the continuous print processing is desirable in maintaining the chromogenic property of the output image almost uniformly. However, when the color calibration processing is inserted, the recording sheet 42 on which the requested image (image requested by the user to be printed) is printed and the recording sheet 42 on which the test image for the color calibration is printed are mixed on the discharge tray 302, and it becomes necessary to separate the recording sheets 42. That is, when the recording sheet 42 on which the requested image is printed and the recording sheet 42 on which the test image is printed are mixed, it becomes necessary to take time to separate the test image. When they are mixed as stated above, a post-processing such as a staple processing, a sheet folding processing or a bookbinding processing can not be performed.

Then, the printer apparatus 10 of this embodiment discharges the recording sheet 42 on which the requested image is printed and the recording sheet on which the test image is printed to the discharge trays 302 different from each other.

FIG. 2 is a view exemplifying a functional structure of the controller 20 and the image processing device 22.

As exemplified in FIG. 2, the controller 20 includes an I/O control part 200, a calibration value determination part 202, a timing control part 204, a patch output instruction part 206 (interrupt unit), an discharge control part 208 and an external device control part 210 (interrupt control unit). The image processing device 22 includes a correction value changing part 220, an image correction part 222, a test pattern generation part 224 and a writing control part 226.

The respective components included in the controller 20 and the image processing device 22 may be realized in software by a CPU, a memory and a program, or may be realized in hardware by an ASIC or the like.

In the controller 20, the I/O control part 200 controls data input from the outside and data output to the outside. Specifically, the I/O control part 200 acquires print request data including image data and the like from the image reading unit 12 (FIG. 1) or the personal computer of the user, and outputs the acquired print request data to the external device control part 210. The print request data includes, in addition to the image data requested by the user to be printed, the kind of recording sheet used for the printing, the number of sheets to be printed, tray designation information for designating the discharge tray and the like.

Besides, the I/O control part 200 acquires the characteristic amount of the test image measured by the calorimetric sensor 189 (FIG. 1), and outputs the acquired characteristic amount of the test image to the calibration value determination part 202.

The calibration value determination part 202 performs the color calibration processing of the printer apparatus 10 on the basis of the characteristic amount of the test image inputted from the I/O control part 200. Specifically, the calibration value determination part 202 compares the characteristic amount inputted from the I/O control part 200 with the target value of the color calibration processing (for example, a previously set fixed value made to correspond to the identification information of the test image) to determine a color calibration value, and outputs the determined color calibration value to the correction value changing part 220 through the external device control part 210. That is, the calibration value determination part 202 causes the correction value changing part 220 to update a lookup table (correction coefficient) stored in the image correction part 222 according to the determined color calibration value. As stated above, when the lookup table (LUT) is updated according to the calibration value determined by the calibration value determination part 202, since the image data is corrected by referring to the LUT, the chromogenic property of the image outputted by the printer apparatus 10 is changed.

The timing control part 204 controls the operation timings of the respective components of the printer apparatus 10 according to the print request data inputted by the user so as to realize the requested print processing. Specifically, the timing control part 204 determines the timing when the image data and the like are outputted to the image correction part 222 from the external device control part 210 according to the operation mode (picture quality priority mode, speed priority mode, two-side print mode, color print mode, etc.) set on the basis of the print request data.

When judging that it is necessary to insert the color calibration processing during the continuous printing on the basis of the print request data, the patch output instruction part 206 of the timing control part 204 outputs the print instruction of the test image at a predetermined timing to the external device control part 210. For example, in the case where the number of printing sheets requested by the print request data is a predetermined value or more, the patch output instruction part 206 judges that it is necessary to insert the color calibration processing, and outputs the print instruction of the test image.

The discharge control part 208 controls the tray switching part 304 (FIG. 1) through the external device control part 210. That is, the discharge control part 208 controls the timing of the distributing operation of the tray switching part 304 according to whether the timing is the timing when the recording sheet 42 on which the requested image is printed is discharged or the timing when the recording sheet 42 on which the test image is printed is discharged.

The external device control part 210 creates at least one job on the basis of the print request data inputted from the I/O control part 200, and outputs the created job to the image processing device 22 at the timing instructed by the timing control part 204. Here, the job means a processing unit which can be processed in a same operation mode in a latter stage (the image processing device 20, the image forming unit 14, the intermediate transfer device 16, the sheet tray 17, the sheet transporting passage 18, the fixing unit 19, the post-processing device 30, etc.). That is, in the components such as the image processing device 20, the image forming unit 14, the intermediate transfer device 16, the sheet tray 17, the sheet transporting passage 18, the fixing unit 19, and the post-processing device 30, a processing speed at which a processing can be performed is previously determined for each operation mode, and the external device control part 210 submits the respective jobs at timings (timings adapted to the process speed of toner image formation, the sheet transport speed and the like) when the processing can be performed in the respective components. Incidentally, the criteria on which the job is created is not limited to this, and for example, the external device control part 210 may forcibly divide the job in order to insert a calibration job for performing the color calibration processing. In the following description, the job created on the basis of the print request data will be called "request job", and the job for color calibration will be called "calibration job".

The external device control part 210 creates the calibration job for performing the color calibration (including test image forming processing) according to the instruction from the patch output instruction part 206, and inserts the calibration job in plural request jobs (continuous forming processing) created on the basis of the print request data. In this case, the external device control part 210 attaches tray designation information, which designates the discharge tray 302 (FIG. 1) designated by the user, to the request job created on the basis of the print request data, and attaches tray designation information for designating the discharge tray 302 different from one designated in the request job to the calibration job. By this, the tray switching part 304 (FIG. 1) can distribute the recording sheet 42 transported on the basis of the request job and the recording sheet 42 transported on the basis of the calibration job to the discharge trays 302 different from each other.

In the image processing device 22, on the basis of the calibration value determined by the calibration value determination part 202, the correction value changing part 220 updates the LUT to which the image correction part 22 refers.

The image correction part 222 corrects the image data according to the request job or the calibration job inputted from the image device control part 210, and outputs the corrected image data to the writing control part 226. Specifically, the image correction part 222 refers to the previously stored LUT, adjusts the gradation characteristic of the image data, performs sharpness correction, resolution conversion and the like, and makes output to the writing control part 226. Correction coefficients used for the respective correction processings such as the gradation correction processing and the sharpness correction processing are registered in the LUT stored in the image correction part 222, and the image correction part 222 makes a correction on the basis of the correction coefficients registered in the LUT so that the inputted image data is reproduced on the recording sheet 42 with the desired color and sharpness.

The test pattern generation part 224 previously stores data of the test image used for the color calibration processing, and when the calibration job is submitted, the data of this test image is outputted to the image correction part 222. The test image inputted to the image correction part 222 is subjected to substantially the same correction processing as the image data included in the request job.

The writing control part 226 controls the optical scanning device 140 (FIG. 1) according to the image data (binary value) inputted from the image correction part 222. For example, the writing control part 226 generates a pulse signal according to the inputted image data (requested image or test image), and outputs this pulse signal to the optical scanning device 140, so that the optical scanning device 140 is turned on and off.

In this embodiment, the correction value changing part 220 updates, according to the calibration value determined by the calibration value determination part 202, the LUT (look up table) to which the image correction part 222 refers, so that the chromogenic property of the printer apparatus 10 is adjusted. However, the invention is not limited to this, and the printer apparatus 10 may adjust the color development of the image formed on the recording sheet 42 and realize the color calibration of the printer apparatus 10 by performing, for example, the adjustment of the transfer processing (contact force or electrostatic force) using the primary transfer roll 162 (FIG. 1) or the secondary transfer roll 185 (FIG. 1) or the adjustment of the fixing processing (heat temperature or pressurization force) using the fixing unit 19 according to the calibration value determined by the calibration value determination part 202.

FIGS. 3A and 3B are views exemplifying the request jobs created by the external device control part 210, in which FIG. 3A exemplifies the request jobs divided according to the kind of the recording sheet 42 used for the printing, and FIG. 3B exemplifies the request jobs further divided according to the number of printing sheets and the kind of screen.

As exemplified in FIG. 3A, the external device control part 210 creates the plural request jobs on the basis of the print request data. The print request data of this embodiment includes, in addition to the image data to be printed, designation information to designate the number of printing sheets, recording sheets used for the printing (plain paper, thick paper, coat paper, etc.), color/black and white, two-side/one-side, discharge tray, print resolution and the like, and the external device control part 210 divides a series of print processings into plural jobs according to the designation information.

As exemplified in FIG. 3B, the external device control part 210 further divides "job 3" into "job 3.1", "job 3.2", and "job 3.3". This is because the number of sheets to be printed exceeds a previously set upper limit value by "job 3", and the external device control part 210 divides the job so that the number of sheets to be printed in the respective jobs ("job 3.1" to "job 3.3") is the upper limit value or less.

The external device control part 210 further divides the request job according to the combination of screens used by the image correction part 222. Although the image correction part 222 of this embodiment selects the screen according to the image attribute of each image area, the screen applied by the image correction part 222 may be selected according to the designation by the user. The printer apparatus 10 may acquire image data previously subjected to the screen processing from the user.

FIG. 4 is a view exemplifying job data in which a calibration job is inserted.

As exemplified in FIG. 4, the external device control part 210 inserts the calibration job, according to the control of the patch output instruction part 206, between plural request jobs (in this embodiment, between "job 4" and "job 5") created on the basis of the print request data. The calibration job is the job which prints the test image by using the recording sheet and the screen used in a subsequent job, and performs the color calibration processing on the basis of the test image. The external device control part 210 of this embodiment uses the calibration job to designate "tray 2" as the discharge tray different from the discharge tray "tray 1" designated by the request job (that is, the tray designated by the user).

FIG. 5 is a view exemplifying a calibration table to which reference is made in the case where the calibration value determination part 202 determines the calibration value.

As exemplified in FIG. 5, the calibration value determination part 202 includes a calibration table in which the combination of the kind of recording sheet, the kind of screen, the identification information of a test image, and differential data is made to correspond to a calibration value. The differential data is the data indicating a difference between the characteristic amount read from the test image printed on the recording sheet and the reference characteristic amount set as the target value of the color calibration. The calibration value is the value for adjusting the chromogenic property of the printer apparatus 10 so that the corresponding difference becomes small.

Figure 6:
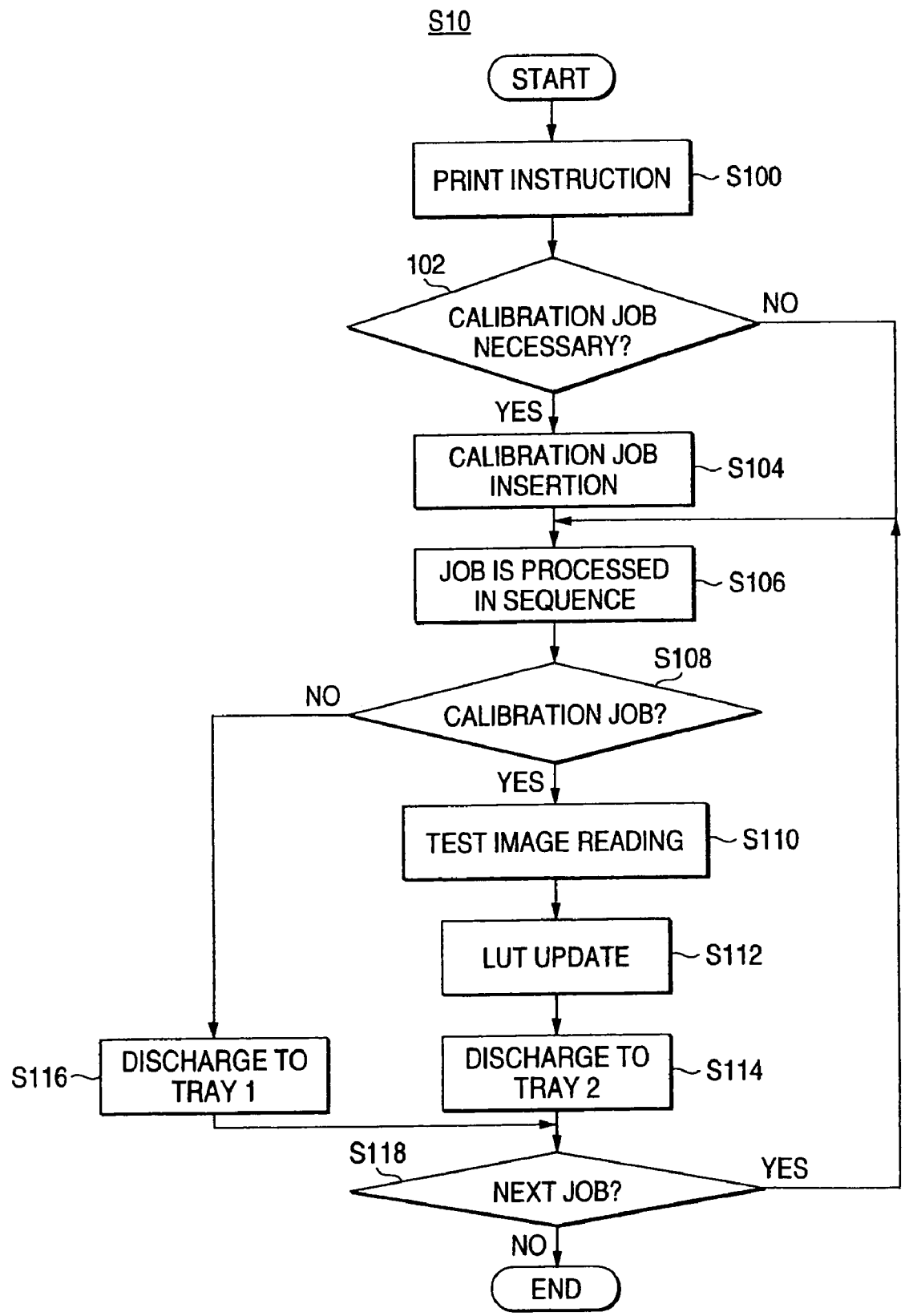
FIG. 6 is a flowchart of a print processing (S10) of the printer apparatus 10.

FIG. 6 is a flowchart of a print processing (S10) by the printer apparatus 10.

As shown in FIG. 6, at step 100 (S100), the printer apparatus 10 waits in the standby state until the print request is made. The printer apparatus 10 may create the calibration job during the standby state and performs the color calibration processing.

The user makes the print request to the printer apparatus 10 in the standby state through the personal computer or UI device (not shown). In this embodiment, a description will be given to, as a specific example, a case where the user designates the first discharge tray 302a as the discharge destination of the recording sheet 42.

The I/O control part 200 (FIG. 2) in the controller 20 acquires, according to this, the print request data including the image data and the designation information to designate the number of printing sheets and the like, and outputs it to the external device control part 210.

The external device control part 210 creates at least one request job on the basis of the inputted print request data.

At step 102 (S102), the patch output instruction part 206 specifies the number of printing sheets to be continuously printed on the basis of the inputted print request data, and in the case where the specified number of printing sheets exceeds the upper limit value of the number of sheets, which requires the insertion of the color calibration processing, the patch output instruction part instructs the external device control part 210 to insert the calibration job, and proceeds to the processing of S104. In the case where the specified number of printing sheets is the upper limit value of the number of sheets or less, the procedure proceeds to processing of S106. In the case where plural pieces of print request data are continuously submitted, the patch output instruction part 206 sums the numbers of printing sheets for the respective non-processed request jobs corresponding to the print request data, and judges whether the sum exceeds the upper limit value of the number of sheets.

At step 104 (S104), the external device control part 210 creates, according to the instruction of the patch output instruction part 206, the calibration job in which the discharge tray 302 (FIG. 1) different from one designated in the request job is designated as the discharge destination, and inserts the created calibration job between plural request jobs.

At step 106 (S106), the external device control part 210 outputs the created request job and the calibration job to the respective components such as the image processing device 22 and the tray switching part 304 (FIG. 1) in sequence at timings instructed by the timing control part 204.

The image correction part 222 performs the correction processing on the image data of the requested image or the image data of the test image according to the job (request job or calibration job) inputted from the external device control part 210, and outputs the image data subjected to the correction processing to the writing control part 226.

The writing control part 226 controls the respective optical scanning devices 140 on the basis of the inputted image data (requested image or test image), and causes the electrostatic latent images to be formed on the photosensitive drums 152. The electrostatic latent images (requested image or test image) formed on the photosensitive drums 152 are developed into toner images by the developing units 156, and are multiple-transferred onto the intermediate transfer belt 160. The sheet tray 17 and the sheet transporting passage 18 transport the recording sheet 42 designated by the user to the secondary transfer position according to the job inputted from the external device control part 210. The toner images (requested image or test image) on the intermediate transfer belt 160 are transferred onto the recording sheet 42 transported to the secondary transfer position, and the sheet is transported to the fixing unit 19 and is subjected to the fixing processing.

At step 108 (S108), the printer apparatus 10 proceeds to the processing of S110 in the case where the job under processing is the calibration job, and proceeds to the processing of S116 in the case where the job under processing is the request job.

At step 110 (S110), the recording sheet 42 (on which the test image is printed) subjected to the fixing processing is transported on the discharge passage 187. The colorimetric sensor 189 (FIG. 1) reads the test image from the recording sheet 42 transported on the discharge passage 187 according to the calibration job inputted from the external device control part 210, and outputs the characteristic amount of the read test image to the I/O control part 200 (FIG. 2).

At step 112 (S112), the I/O control part 200 outputs the characteristic amount of the test image inputted from the calorimetric sensor 189 to the calibration value determination part 202.

The calibration value determination part 202 calculates a difference between the inputted characteristic amount and the target characteristic amount, and outputs the calibration value corresponding to the calculated differential data to the correction value changing part 220.

The correction value changing part 220 updates the LUT stored in the image correction part 222 according to the inputted calibration value.

At step 114 (S114), when the recording sheet 42 (on which the test image is printed) transported on the discharge passage 187 reaches the position of the tray switching part 304, the tray switching part 304 distributes the transported recording sheet 42 to the second post-processing passage 306b according to the calibration job inputted from the external device control part 210 (FIG. 2). The recording sheet 42 (on which the test image is printed) distributed to the second post-processing passage 306b is further transported, and is discharged onto the second discharge tray 302b.

At step 116 (S116), when the recording sheet 42 (on which the requested image is printed) transported on the discharge passage 187 reaches the position of the tray switching part 304, the tray switching part 304 distributes the transported recording sheet 42 to the first post-processing passage 306a according to the request job inputted from the external device control part 210 (FIG. 2). The recording sheet 42 (on which the requested image is printed) distributed to the first post-processing passage 306a is further transported, and is discharged onto the first discharge tray 302a (that is, the discharge tray designated by the user).

At step 118 (S118), the external device control part 210 judges whether a non-processed job (request job or calibration job) exists, and in the case where the non-processed job exists, the external device control part returns to the processing of S106 and submits a next job, and in the case where there is no non-processed job, it ends the print processing and returns to the standby state.

As described above, in the case where the color calibration processing is inserted, the printer apparatus 10 discharges the recording sheet on which the requested image is printed and the recording sheet on which the test image is printed to the discharge trays 302 different from each other. By this, it becomes easy to separate the recording medium on which the test image is printed.

MODIFIED EXAMPLE

Next, a modified example of the first embodiment will be described.

In the above embodiment, although the description has been given to, as the specific example, the mode in which the recording sheet on which the requested image is printed and the recording sheet on which the test image is printed are discharged to the different discharge trays 303, the invention is not limited to this. For example, the printer apparatus 10 may discharge these recording sheets onto the same discharge tray at different positions or in different directions.

Figure 7A:
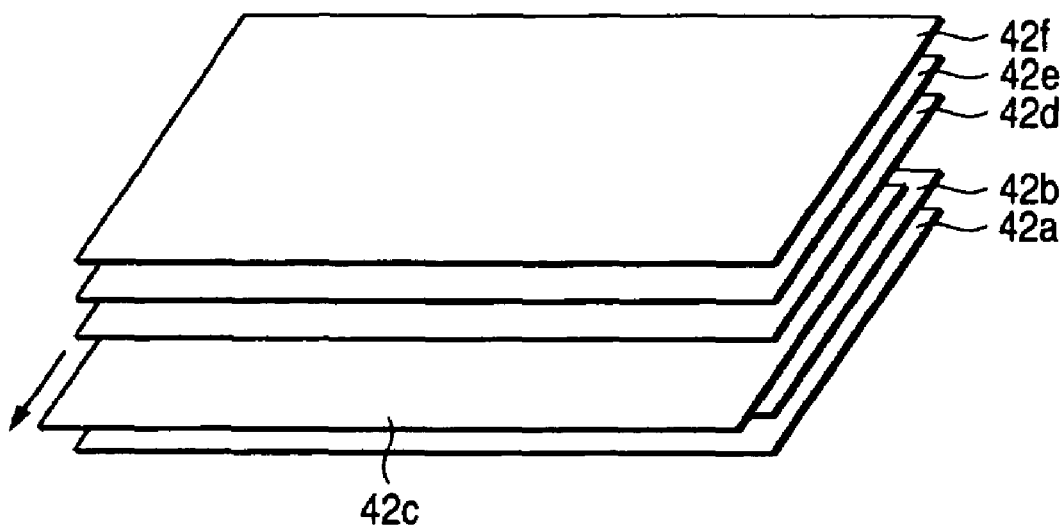
FIG. 7A is a view exemplifying a recording sheet 42 discharged to a same discharge tray 303 while the position thereof is shifted.
Figure 7B:
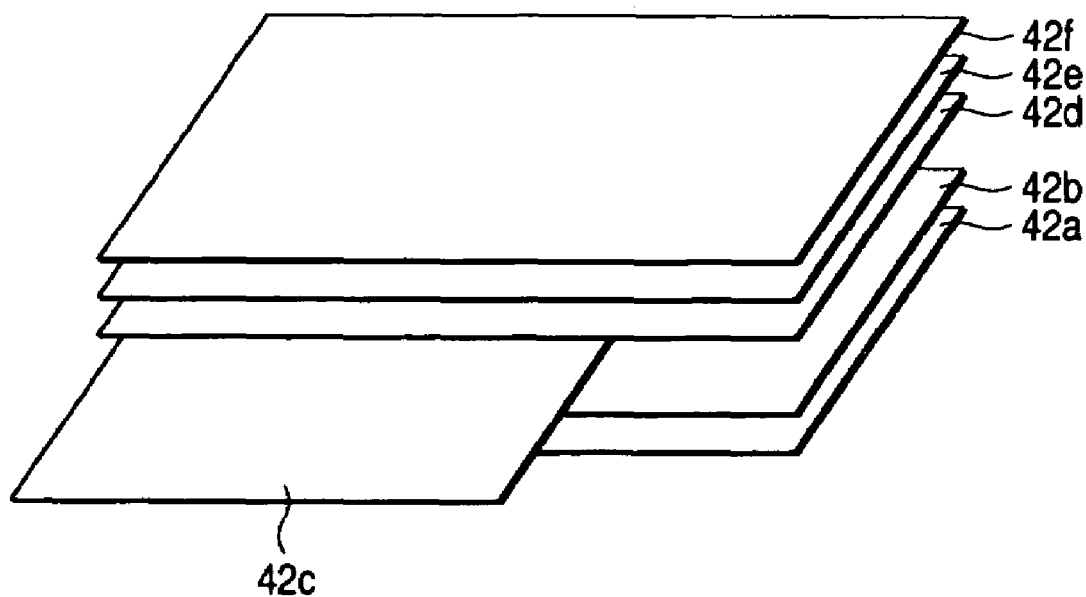
FIG. 7B is a view exemplifying a recording sheet 42 discharged to the same discharge tray 303 while the direction thereof is changed.

FIG. 7A is a view exemplifying a recording sheet 42 discharged onto a same discharge tray 303 while its position is shifted, and FIG. 7B is a view exemplifying a recording sheet 42 discharged onto a same discharge tray 303 while its direction is changed.

As exemplified in FIG. 7A, the post-processing device 30 discharges the recording sheet on which the requested image is printed and the recording sheet on which the test image is printed to positions relatively different from each other on the same discharge tray 302. In this example, the post-processing device 30 discharges the recording sheet 42c on which the test image is printed while shifting it in a direction (normal direction) different from the transport direction with respect to the recording sheets 42a, 42b, 42d to 42f on which the requested images are printed. For example, the post-processing device 30 moves the discharge tray 302 in the direction vertical to the paper surface of FIG. 1, so that the recording sheet 42 on which the requested image is printed and the recording sheet 42 on which the test image is printed are discharged to the relatively different positions on the same discharge tray 42 (hereinafter referred to as "offset discharge").

Besides, as exemplified in FIG. 7B, the post-processing device 30 discharges the recording sheet on which the test image is printed onto the same discharge tray 302 to have a direction different from the recording sheet on which the requested image is printed. The post-processing device 30 of this example discharges the recording sheet 42c on which the test image is printed onto the same discharge tray 302 in such a state that the sheet is rotated by 90 degrees with respect to the recording sheets 42a, 42b, 42d to 42f on which the requested images are printed.

The printer apparatus 10 may determine whether or not the print processing of the test image is inserted in the print processing of the requested image according to whether plural recording sheets can be distributed to the different discharge trays 302 or whether plural recording sheets can be discharged onto the same discharge tray 302 at different positions or in different directions. That is, the printer apparatus 10 allows the insertion of the test image print processing only in the case where it is possible to perform the discharge to the plural discharge trays 302 or at different positions or in different directions.

Figure 8:
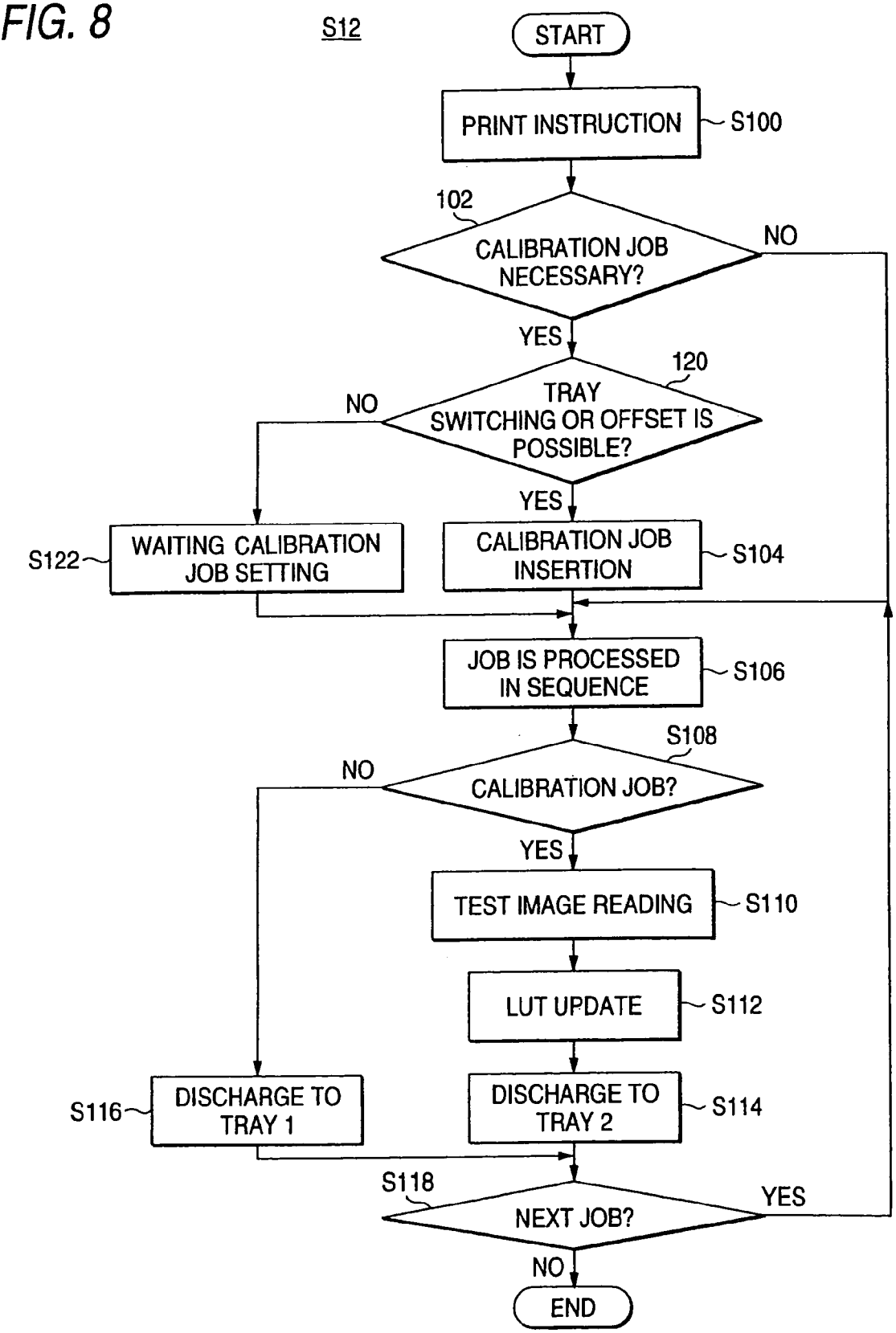
FIG. 8 is a flowchart showing an operation (S12) of the printer apparatus 10 which allows or inhibits the insertion of a test image print processing according to whether switching of an discharge tray or offset discharge is possible.

FIG. 8 is a flowchart showing an operation (S12) of the printer apparatus 10 which allows or inhibit the insertion of the test image print processing according to whether it is possible to perform the switching of discharge trays or the offset discharge. Incidentally, in respective processings shown in FIG. 8, those substantially equal to the processings shown in FIG. 6 are denoted by the same symbols.

As shown in FIG. 8, when it is judged at S102 that a calibration job is necessary, at step 120 (S120), the external device control part 210 judges the state of the post-processing device 30 (usable discharge trays, or the offset discharge is possible, or the like).

In the case where the plural discharge trays can be used or the offset discharge is possible, the external device control part 210 proceeds to the processing of S104, and in the case where only one discharge tray can be used and the offset discharge is impossible, it proceeds to the processing of S122. That is, in the case where the switching of the trays or the offset discharge is possible, the external device control part 210 inserts the calibration job, and in the case where both the switching of the trays and the offset discharge are impossible, it inhibits the insertion of the calibration job.

At step 122 (S122), the external device control part 210 performs scheduling of the calibration job so that the calibration job is submitted when the printer apparatus 10 is put in the standby state. In this case, when the requested image is continuously printed, the printer apparatus 10 does not perform the printing of the test image, and in the case where all request jobs are ended, the printer apparatus performs the color calibration processing in accordance with the set schedule.

As stated above, the printer apparatus 10 in this modified example performs the color calibration processing at the optimum timing according to the number of discharge trays or the like.

Next, a second embodiment will be described.

In the former embodiment, the description has been given to the mode in which the discharge processing of the sheet as an example of the post-processing is switched between the case where the requested image is printed and the case where the test image is printed. In the second embodiment, a description will be given to a mode in which as another example of the post-processing, a working processing such as a staple processing is switched.

Figure 9:
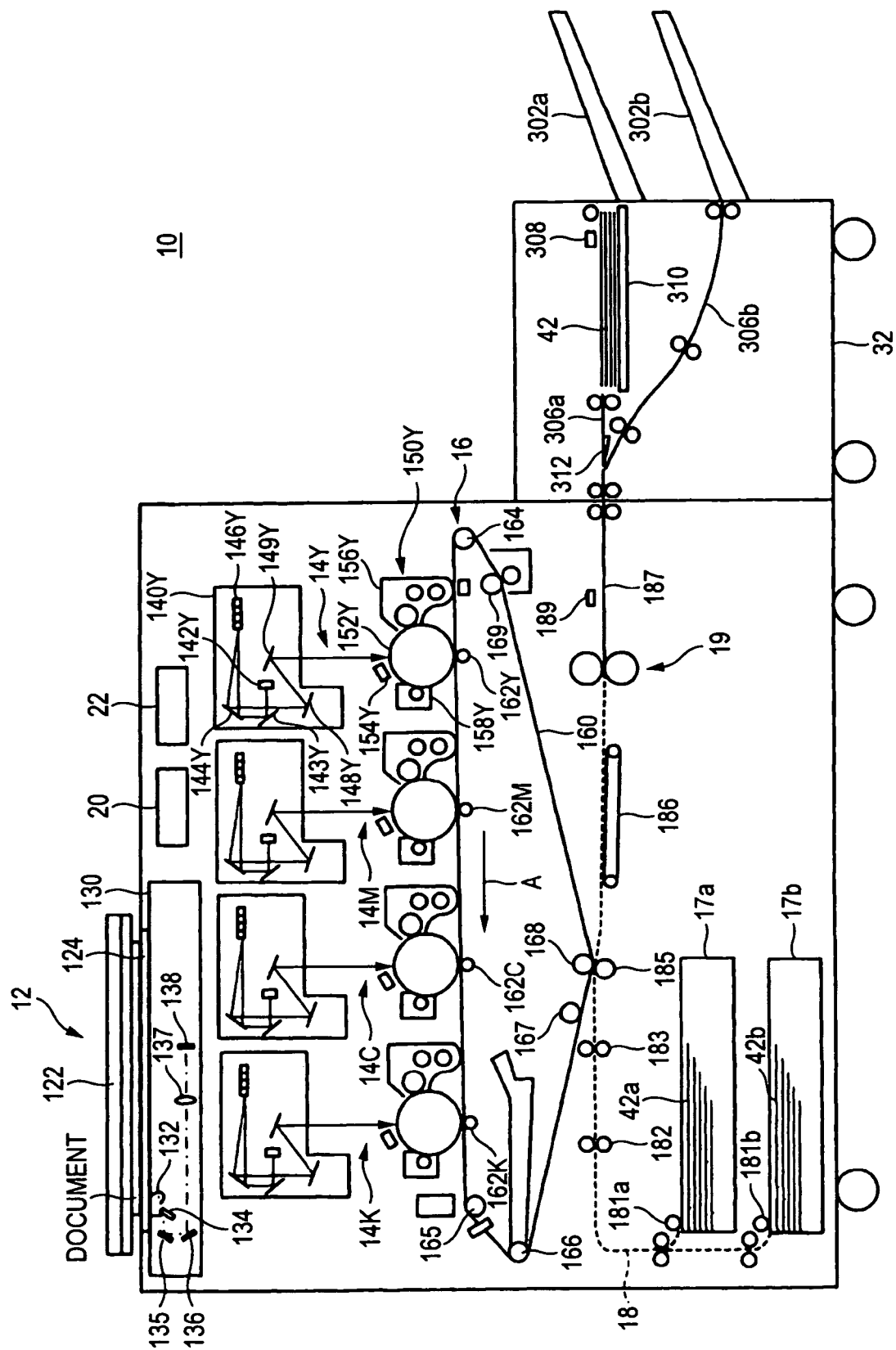
FIG. 9 is a view showing a structure of a printer apparatus 10 in a second embodiment.

FIG. 9 is a view showing a structure of a printer apparatus 10 of the second embodiment. In components shown in FIG. 9, those substantially equal to the components shown in FIG. 1 are denoted by the same symbols.

As shown in FIG. 9, the printer apparatus 10 of this embodiment includes a post-processing device 32 provided with a staple function.

The post-processing device 32 in this embodiment is a staple device externally attached to the printer apparatus main body, and includes, in addition to plural discharge trays 302 and plural post-processing passages 306, a staple processing part 308 for performing a staple processing, a staple work stand 310 for placing the recording sheet as the object of the staple processing, and a post-processing switching part 312 for switching whether the staple processing should be performed or not.

When the recording sheet 42 (on which a requested image, a test image or the like is printed) is transported to the post-processing device 32, the post-processing switching part 312 distributes the transported recording sheet 42 to the first post-processing passage 306a or the second post processing passage 306b. That is, in the case where the post-processing (staple processing) is performed on the transported recording sheet 42, the post-processing part 312 distributes this recording sheet 42 to the first post-processing passage 306a in which a post-processing unit (staple processing part) is provided, and in the case where the post-processing is not performed on the transported recording sheet 42, it distributes this recording sheet 42 to the second post-processing passage 306b.

The staple work stand 310 is provided at the downstream side of the first post-processing passage 306a, and the transported recording sheet 42 is placed thereon. The stable processing part 308 sticks a staple pin into the recording sheets 42 placed on the staple work stand 310 according to the control from the controller 20. The recording sheets 42 stuck with the staple pin are discharged onto the first discharge tray 302a when the staple processing is completed.

The recording sheet 42 distributed to the second post-processing passage 306b is discharged onto the second discharge tray 302b as it is.

Figure 10:
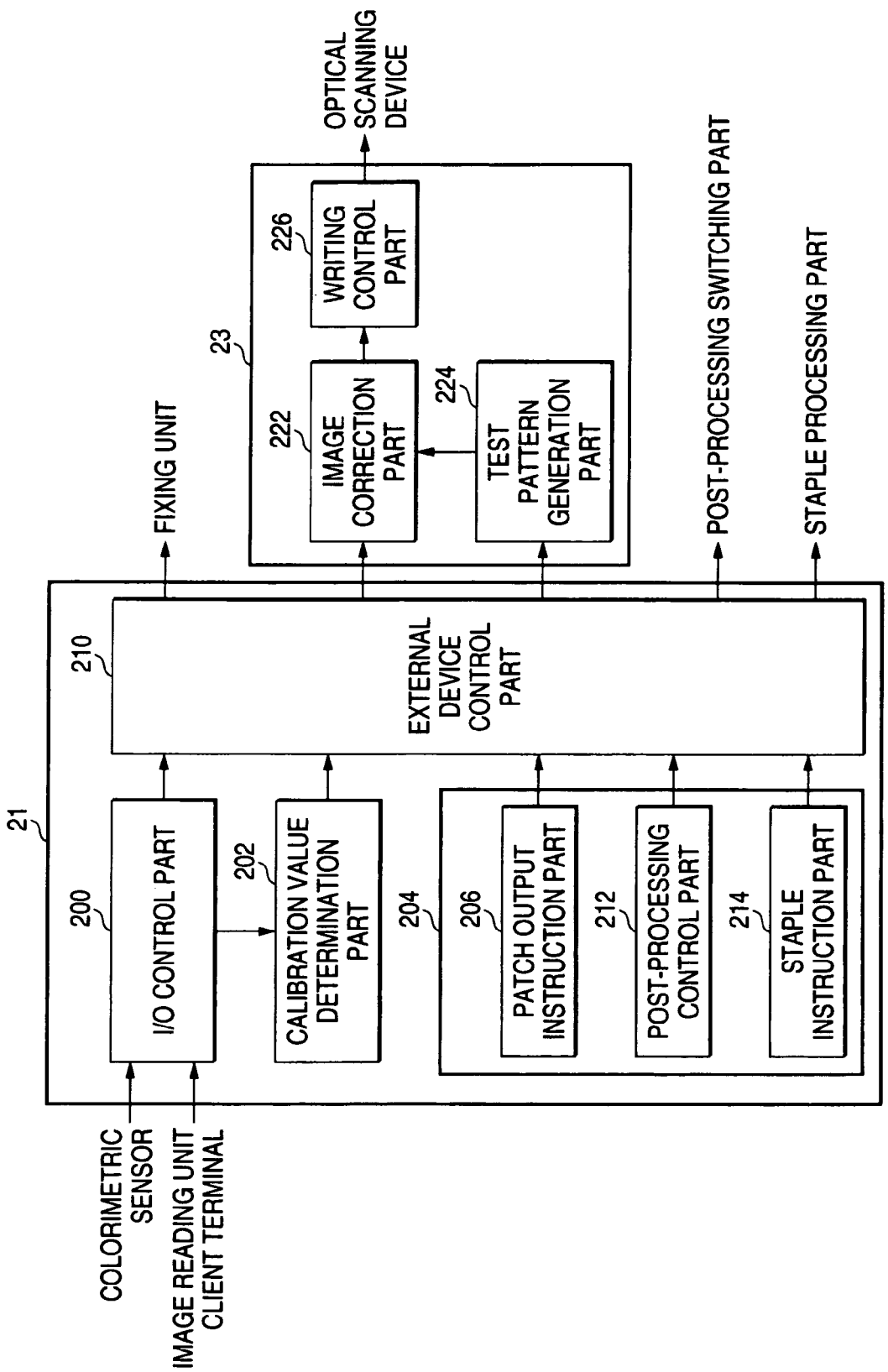
FIG. 10 is a view exemplifying a functional structure of a controller 21 and an image processing device 23 in the second embodiment.

FIG. 10 is a view exemplifying a functional structure of a controller 21 and an image processing device 23 in the second embodiment. In components shown in FIG. 10, those substantially equal to the components shown in FIG. 2 are denoted by the same symbols.

As exemplified in FIG. 10, the controller 21 in this embodiment has such a structure that the discharge control part 208 is deleted and a post-processing control part 212 and a staple instruction part 214 are added. The image processing device 23 has such a structure that the correction value changing part 220 is deleted.

In the controller 21, the post-processing part 212 controls the post-processing switching part 312 (FIG. 9) through the external device control part 210. Specifically, the post-processing control part 212 controls the timing of the distributing operation of the post-processing switching part 312 according to whether the timing is the timing when the recording sheet 42 on which the requested image is printed is discharged or the timing when the recording sheet 42 on which the test image is printed is discharged.

The staple instruction part 214 controls the staple processing part 308 (FIG. 9) through the external device control part 210. Specifically, the staple instruction part 214 causes the staple processing part 308 to stick the staple pin at the timing when the recording sheets 42 as the object of the staple processing are assembled on the staple work stand.

The calibration value determination part 202 in this embodiment controls the fixing unit 19 through the external device control part 210, and adjusts the fixing temperature or pressurizing force in the fixing processing according to the determined calibration value. That is, the calibration value determination part 202 adjusts the fixing processing to correct the chromogenic property.

FIG. 11 is a view exemplifying job data (in which a calibration job is inserted) created in the second embodiment.

As exemplified in FIG. 11, the external device control part 210 creates the request job including instruction information of the staple processing. In this embodiment, "staple #1" and "staple #2" are the instruction information of the staple processing, and "#1" and "#2" are identification data indicating object groups of the staple processing. For example, plural recording sheets printed by the request jobs including "staple #1" are assembled into one copy by the staple pin.

The external device control part 210 inserts the calibration job between plural request jobs (in this embodiment, between "job 4" and "job 5") created according to the control of the patch output instruction part 206. The external device control part 210 of this example attaches the instruction information to inhibit the staple processing to the calibration job. The post-processing device 32 inhibits the staple processing according to the instruction information attached to the calibration job.

Figure 12:
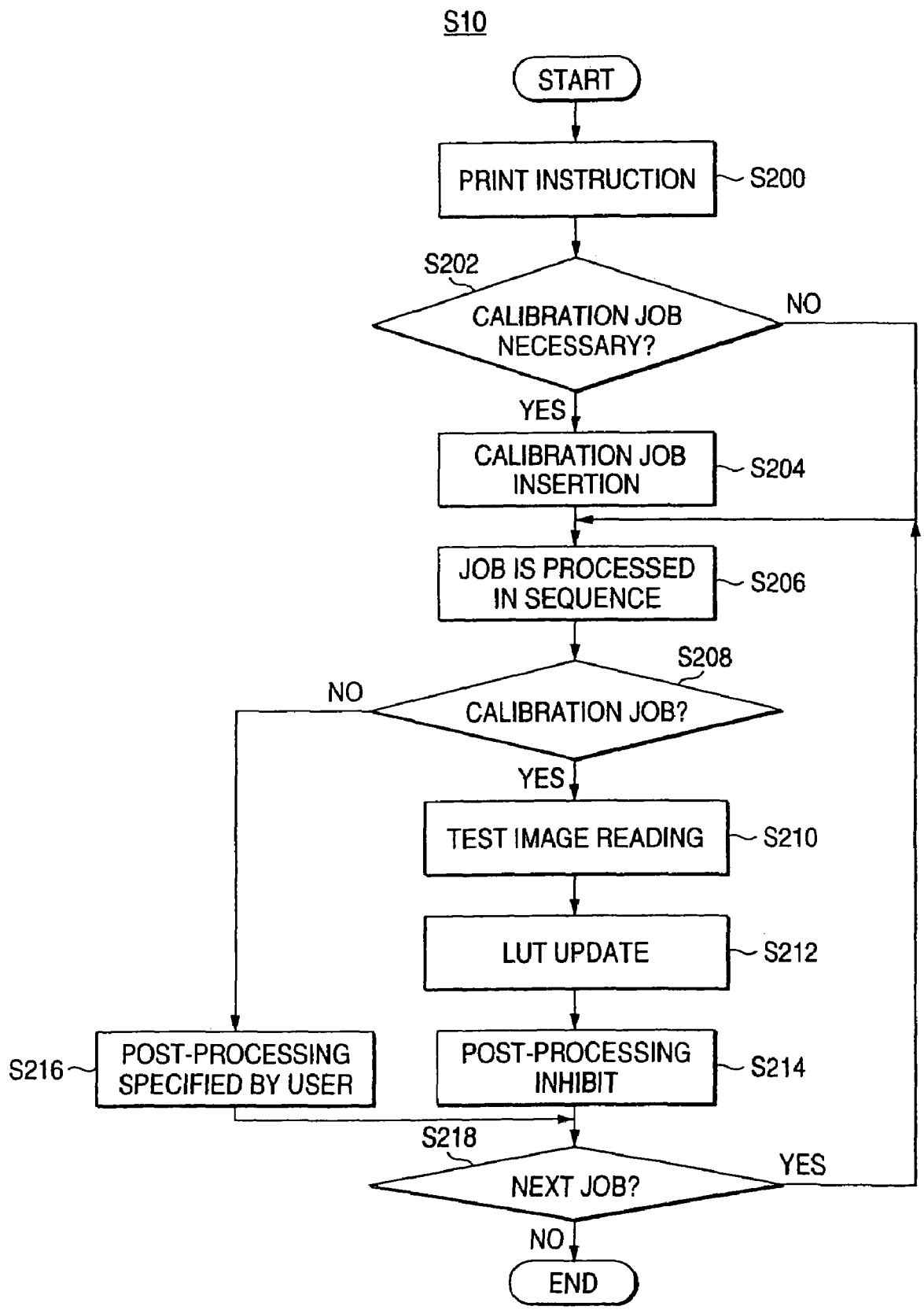
FIG. 12 is a flowchart of a print processing (S20) in the second embodiment.

FIG. 12 is a flowchart of a print processing (S20) in the second embodiment.

As shown in FIG. 12, at step 200 (S200), the user makes a print request to the standby printer apparatus 10 through a personal computer or a UI device (not shown). In this example, a description will be given to, as a specific example, a case where the user specifies the staple processing on the requested image.

In response to this, the I/O control part 200 (FIG. 10) in the controller 21 acquires print request data including the image data and the designation information to designate the number of printing sheets and the like, and outputs it to the external device control part 210.

The external device control part 210 creates at least one request job on the basis of the inputted print request data.

At step 202 (S202), the patch output instruction part 206 specifies the number of printing sheets to be continuously printed on the basis of the inputted data of the number of printing sheets, and in the case where the specified number of printing sheets exceeds the color calibration reference value, the patch output instruction part instructs the external device control part 210 to insert the calibration job, and proceeds to the processing of S204, and in the case where the specified number of printing sheet is the color calibration reference value or less, it proceeds to the processing of S206.

At step 204 (S204), the external device control part 210 creates the calibration job to designate the inhibition of the staple processing according to the instruction of the patch output instruction part 206, and inserts the created calibration job between plural request jobs.

At step 206 (S206), the external device control part 210 outputs the created request job and the calibration job sequentially to the respective components such as the image processing device 23, the post-processing switching part 312 (FIG. 9), and the staple processing part 308 (FIG. 9) at timings instructed by the timing control part 204.

The image correction part 222 performs the correction processing on the image data of the requested image or the image data of the test image according to the job (request job or calibration job) inputted from the external device control part 210 and outputs the image data subjected to the correction processing to the writing control part 226.

The writing control part 226 controls the respective optical scanning devices 140 on the basis of the inputted image data (requested image or test image), and causes the electrostatic latent images to be formed on the photosensitive drums 152. The electrostatic latent images (requested image or test image) formed on the photosensitive drums 152 are developed into toner images by the developing units 156, and are multiple-transferred onto the intermediate transfer belt 160. The sheet tray 17 and the sheet transporting passage 18 transport the recording sheet 42 designated by the user to the secondary transfer position according to the job inputted from the external device control part 210. The recording sheet 42 transported to the secondary transfer position is transferred with the toner images (requested image or test image) on the intermediate transfer belt 160, is transported to the fixing unit 19, and is subjected to the fixing processing.

At step 208 (S208), the printer apparatus 10 proceeds to the processing of S210 in the case where the job under processing is the calibration job, and it proceeds to the processing of S216 in the case where the job under processing is the request job.

At step 210 (S210), the recording sheet 42 (on which the test image is printed) subjected to the fixing processing is transported on the discharge passage 187. The colorimetric sensor 189 (FIG. 9) reads the test image from the recording sheet 42 transported on the discharge passage 187 according to the calibration job inputted from the external device control part 210, and outputs the characteristic amount of the read test image to the I/O control part 200 (FIG. 10).

At step 212 (S212), the I/O control part 200 outputs the characteristic amount of the test image inputted from the calorimetric sensor 189 to the calibration value determination part 202.

The calibration value determination part 202 calculates a difference between the inputted characteristic amount and the target characteristic amount, and outputs the calibration value corresponding to the calculated differential data to the fixing unit 19 (FIG. 9).

The fixing unit 19 adjusts at least one of the heating temperature and the pressurizing force according to the inputted calibration value.

At step 214 (S214), when the recording sheet 42 (on which the test image is printed) transported on the discharge passage 187 reaches the position of the post-processing switching part 312 (FIG. 9), the post-processing switching part 312 distributes the transported recording sheet 42 to the second post-processing passage 306b according to the calibration job inputted from the external device control part 210 (FIG. 10). The recording sheet 42 (on which the test image is printed) distributed to the second post-processing passage 306b is not subjected to the staple processing but is discharged to the second discharge tray 302b as it is. The printer apparatus 10 in this embodiment may discharge the recording sheet 42 on which the test image is printed to the discharge tray (or discharge port) provided in the printer apparatus main body as it is.

At step 216 (S216), when the recording sheet 42 (on which the requested image is printed) transported on the discharge passage 187 reaches the position of the post-processing switching part 312 (FIG. 9), the post-processing switching part 312 distributes the transported recording sheet 42 to the first post-processing passage 306a according to the request job inputted from the external device control part 210 (FIG. 10). The recording sheet 42 (on which the requested image is printed) distributed to the first post-processing passage 306a is further transported, and is placed on the staple work stand 310.

The staple processing part 308 judges the timing when the staple processing is performed on the basis of the request job inputted from the external device control part 210. When the staple processing part 308 performs the staple processing according to the request job, the recording sheets 42 assembled by the staple pin are discharged onto the first discharge tray 302a.

At step 218 (S218), the external device control part 210 judges whether or not a non-processed job (request job or calibration job) exists, and in the case where the non-processed job exists, the external device control part returns to the processing of S206, and submits a next job, and in the case where the non-processed job does not exist, it ends the print processing and returns to the standby state.

In this embodiment, although the description has been given while the staple processing is made the specific example of the post-processing performed by the post-processing device 32, the invention is not limited to this, and the post-processing device 32 may perform, for example, a saddle stitch binding processing using a staple or a wire, a perfect binding processing by pasting, a sheet folding processing or the like. That is, the post-processing device 32, as a saddle stitch binder or a perfect binder, may bind the recording sheets 42 by using the staple-like member or the adhesive. Also in such a case, the printer apparatus 10 inhibits these post-processings on the recording sheet group including the recording sheet 42 on which the test image is printed.

As described above, the printer apparatus 10 of this embodiment inhibits the post-processing on the recording sheet 42 on which the test image is printed, and allows the desired post-processing only on the recording sheet 42 on which the requested image is printed. By this, it becomes easy to separate the recording sheet on which the test image is printed.

In the case where the post-processing device 32 is the paper folding device, the printer apparatus 10 may be constructed to allow the folding processing on only one of the recording sheet 42 on which the requested image is printed and the recording sheet 42 on which the test image is printed. For example, in the case where the sheet folding processing is not instructed from the user, the printer apparatus 10 may perform the sheet folding processing only on the recording sheet 42 on which the test image is printed so that it becomes easy to separate the recording sheet 42 on which the test image is printed.

In the case where plural post-processing devices 32 are provided in the printer apparatus 10, the printer apparatus 10 causes the recording sheet 42 on which the requested image is printed and the recording sheet 42 on which the test image is printed to be discharged to the post-processing devices 32 different from each other. For example, in the case where the printer apparatus 10 includes the first post-processing device 30 incorporated in the printer apparatus main body and the second post-processing device 32 externally attached to the printer apparatus main body, the printer apparatus outputs the recording sheet 42 on which the requested image is printed from the second post-processing device 32, and outputs the recording sheet 42 on which the test image is printed from the first post-processing device 30. By this, the printer apparatus 10 performs the work processing such as the stapling only on the recording sheet 42 on which the requested image is printed, outputs the recording sheet 42 on which the test image is printed from the first post-processing device 30, and facilitates the separation of the recording sheet 42 on which the test image is printed.

As described above, according to an aspect of the present invention, an image forming apparatus includes an image forming unit that forms an image on a recording medium, a post-processing unit that performs a post-processing on the recording medium on which the image is formed by the image forming unit, and a post-processing controller that controls the post-processing unit according to whether an image requested by a user is formed on the recording medium or a test image is formed on the recording medium.

In the image forming apparatus, the post-processing controller may control the post-processing unit in a case where the requested image and the test image are continuously formed.

The post-processing may be a work processing on the recording medium, and the post-processing controller may inhibit the work processing on the recording medium on which the test image is formed.

Alternatively, the post-processing may be a discharge processing of the recording medium, the post-processing controller may issue an instruction to discharge the recording medium on which the requested image is formed and the recording medium on which the test image is formed to positions different from each other or in directions different from each other, and the post-processing unit may discharge the recording medium on which the requested image is formed and the recording medium on which the test image is formed to the positions different from each other or in the directions different from each other according to the instruction of the post-processing controller.

In the image forming apparatus, the post-processing unit may be a stapler, and the post-processing controller may prohibit a staple processing of the post-processing unit on the recording medium on which the test mage is formed.

Alternatively, the post-processing controller may inhibit a staple processing of the post-processing unit on a recording medium group including the recording medium on which the test image is formed.

In the image forming apparatus, the post-processing unit may be a saddle stitch binder that binds plural recording media by a staple-like member, and the post-processing controller may inhibit a bookbinding processing on the recording medium on which the test image is formed.

The post-processing controller may inhibit, in a case where an object of bookbinding of the saddle stitch binder includes the recording medium on which the test image is formed, a bookbinding processing on the object.

In the image forming apparatus, the post-processing unit may be a perfect binder that binds plural recording media with an adhesive, and the post-processing controller may inhibit a bookbinding processing on the recording medium on which the test image is formed.

The post-processing controller may inhibit, in a case where an object of bookbinding of the perfect binder includes the recording medium on which the test image is formed, a bookbinding processing on the object.

In the image forming apparatus, the post processing unit may be a sheet folding device that folds the sheet-like recording medium, and the post-processing controller may allow a sheet folding processing on one of the recording medium on which the requested image is formed and the recording medium on which the test image is formed.

The image forming apparatus may further include plural discharge trays that carry the recording medium on which the image is formed by the image forming unit. The post-processing controller may issue an instruction to discharge the recording medium on which the requested image is formed and the recording medium on which the test image is formed to the trays different from each other, and the post-processing unit may discharge the recording medium on which the requested image is formed and the recording medium on which the test image is formed to the discharge trays different from each other according to the instruction of the post-processing controller.

Alternatively, the post-processing controller may issue an instruction to discharge the recording medium on which the requested image is formed and the recording medium on which the test image is formed while their relative position is shifted, and the post-processing unit may discharge the recording medium on which the requested image is formed and the recording medium on which the test image is formed to the same discharge tray while their relative position is shifted.

In the image forming apparatus, the post-processing unit may include plural post-processing devices, and the post-processing controller may cause the recording medium on which the requested image is formed and the recording medium on which the test image is formed to be output to the post-processing devices different from each other.

According to another aspect of the present invention, an image forming apparatus includes an interrupt unit that interrupts a continuous formation of plural images requested by a user on plural recording media with formation of a test image including a test pattern on a recording medium, and an interrupt controller that allows or inhibits an interrupt of the test image formation by the interrupt unit according to whether the recording medium on which the requested image is formed and the recording medium on which the test image is formed can be discharged to positions different from each other.

According to another aspect of the invention, an image forming method includes, in a case where an image requested by a user and a test image including a test pattern are continuously formed on plural recording media, instructing post-processings different from each other according to whether the requested image is formed on the recording medium or the test image is formed on the recording medium, and performing the instructed post-processing on the recording medium on which the requested image or the test image is formed.

According to another aspect of the present invention, a computer-readable storage medium stores a program which causes a computer to perform an image forming function, the function including, in a case where an image requested by a user and a test image including a test pattern are continuously formed on plural recording media, instructing post-processings different from each other according to whether the requested image is formed on the recording medium or the test image is formed on the recording medium, and performing the instructed post-processing on the recording medium on which the requested image or the test image is formed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-006519 filed on Jan. 14, 2004 including specification, claims, drawings and abstract is incorporated herein by reference in its entirety.

What is claimed is:

1. An image forming apparatus comprising:
    an image forming unit that forms an image on a recording medium;
    a post-processing unit that performs a post-processing on the recording medium on which the image is formed by the image forming unit;
    a post-processing controller that controls the post-processing unit to perform the post-processing, or to inhibit the post-processing for calibration, at an end of a predetermined print job according to whether an image requested by a user or a test image is formed on the recording medium; and
    a plurality of discharge trays that carry the recording medium on which the image is formed by the image forming unit,
    wherein the test image is printed on the recording medium for calibration,
    the post-processing is a discharge processing of the recording medium,
    the post-processing controller determines the discharge tray to discharge the recording medium on which the test image is formed, based on the discharge tray to discharge the recording medium on which the requested image is formed, and issues an instruction to discharge the recording medium on which the requested image is formed and the recording medium on which the test image is formed to the trays different from each other, and
    the post-processing unit discharges the recording medium on which the requested image is formed and the recording medium on which the test image is formed to the discharge trays different from each other according to the instruction of the post-processing controller.

2. The image forming apparatus according to claim 1, wherein the post-processing controller controls the post-processing unit in a case where the requested image and the test image are continuously formed.

3. The image forming apparatus according to claim 1, wherein
    the post-processing is a work processing on the recording medium, and
    the post-processing controller inhibits the work processing on the recording medium on which the test image is formed.

4. The image forming apparatus according to claim 1, wherein
    the post-processing unit includes a plurality of post-processing devices, and
    the post-processing controller causes the recording medium on which the requested image is formed and the recording medium on which the test image is formed to be output to the post-processing devices different from each other.

5. The image forming apparatus according to claim 3, wherein
the post-processing unit is a stapler, and
the post-processing controller prohibits a staple processing of the post-processing unit on the recording medium on which the test image is formed.

6. The image forming apparatus according to claim 3, wherein
the post processing unit is a staple device, and
the post-processing controller inhibits a staple processing of the post-processing unit on a group of recording media including the recording medium on which the test image is formed.

7. The image forming apparatus according to claim 3, wherein
the post-processing unit is a saddle stitch binder which binds a plurality of recording media by a staple-like member, and
the post-processing controller inhibits a bookbinding processing on the recording medium on which the test image is formed.

8. The image forming apparatus according to claim 3, wherein
the post-processing unit is a saddle stitch binder which binds a plurality of recording media by a staple-like member, and
the post-processing controller inhibits, in a case where an object of bookbinding by the saddle stitch binder includes the recording medium on which the test image is formed, a bookbinding processing on the object.

9. The image forming apparatus according to claim 3, wherein
the post-processing unit is a perfect binder which binds a plurality of recording media with an adhesive, and
the post-processing controller inhibits a bookbinding processing on the recording medium on which the test image is formed.

10. The image forming apparatus according to claim 3, wherein
the post-processing unit is a perfect binder which binds a plurality of recording media with an adhesive, and
the post-processing controller inhibits, in a case where an object of bookbinding by the perfect binder includes the recording medium on which the test image is formed, a bookbinding processing on the object.

11. The image forming apparatus according to claim 3, wherein
the post processing unit is a sheet folding device which folds the sheet-like recording medium, and
the post-processing controller allows a sheet folding processing on one of the recording medium on which the requested image is formed and the recording medium on which the test image is formed.

12. An image forming apparatus, comprising:
an interrupt unit that interrupts continuous formation of a plurality of images requested by a user on a plurality of recording media, respectively, with formation of a test image including a test pattern on a recording medium; and
an interrupt controller that determines a tray available for discharging the recording medium on which the test image is formed and that allows or inhibits an interrupt with the test image formation by the interrupt unit according to whether the recording medium on which the requested image is formed and the recording medium on which the test image is formed can be discharged to trays different from each other.

13. An image forming method comprising:
forming an image on a recording medium, or printing a test image on the recording medium for calibration, by an image forming unit;
performing, by a post-processing unit, a post-processing on the recording medium on which the image is formed by the image forming unit;
controlling the post-processing unit to perform the post-processing, or to inhibit the post-processing for calibration, at an end of a predetermined print job according to whether the image requested by a user or the test image is formed on the recording medium;
determining a discharge tray to discharge the recording medium on which the test image is formed based on the discharge tray to discharge the recording medium on which the requested image is formed;
issuing an instruction to discharge the recording medium on which the requested image is formed and the recording medium on which the test image is formed to the trays different from each other;
discharging the recording medium on which the requested image is formed and the recording medium on which the test image is formed to the discharge trays different from each other according to the instruction; and
carrying the recording medium on which the image is formed.

14. An image forming method comprising:
forming an image on a recording medium, or printing a test image on the recording medium for calibration, by an image forming unit;
performing, by a post-processing unit, a post-processing on the recording medium on which the image is formed by the image forming unit;
controlling the post-processing unit to perform the post-processing, or to inhibit the post-processing for calibration, at an end of a predetermined print job according to whether an image requested by a user or a test image is formed on the recording medium;
issuing an instruction to discharge the recording medium on which the requested image is formed and the recording medium on which the test image is formed while their relative position is shifted;
discharging the recording medium on which the requested image is formed and the recording medium on which the test image is formed onto the same discharge tray while their relative position is shifted; and
carrying a recording medium on which the image is formed.

15. An image forming apparatus comprising:
an image forming unit that forms an image or a test image on a recording medium, the test image being printed on the recording medium for calibration;
a post-processing unit that performs a post-processing on the recording medium on which the image is formed by the image forming unit, the post-processing being a discharge processing of the recording medium;
a post-processing controller that controls the post-processing unit to perform the post-processing, or to inhibit the post-processing for calibration, at an end of a predetermined print job according to whether an image requested by a user or a test image is formed on the recording medium; and
a discharge tray that carries a recording medium on which the image is formed by the image forming unit, wherein the post-processing controller issues an instruction to discharge the recording medium on which the requested image is formed and the recording medium on which the test image is formed to positions different from each other or in directions different from each other, the post-processing unit discharges the recording medium on which the requested image is formed and the recording medium on which the test image is formed to the positions different from each other or in the directions different from each other according to the instruction of the post-processing controller, the post-processing controller issues an instruction to discharge the recording medium on which the requested image is formed and the recording medium on which the test image is formed while their relative position is shifted, and the post-processing unit discharges the recording medium on which the requested image is formed and the recording medium on which the test image is formed onto the same discharge tray while their relative position is shifted.

16. The image forming apparatus according to claim 15, wherein the post-processing unit includes a plurality of post-processing devices, and the post-processing controller causes the recording medium on which the requested image is formed and the recording medium on which the test image is formed to be output to the post-processing devices different from each other.

17. The image forming apparatus according to claim 15, wherein the post-processing controller controls the post-processing unit in a case where the requested image and the test image are continuously formed.

18. The image forming apparatus according to claim 15, wherein the post-processing is a work processing on the recording medium, and the post-processing controller inhibits the work processing on the recording medium on which the test image is formed.

19. The image forming apparatus according to claim 18, wherein the post processing unit is a sheet folding device which folds the sheet-like recording medium, and the post-processing controller allows a sheet folding processing on one of the recording medium on which the requested image is formed and the recording medium on which the test image is formed.

20. The image forming apparatus according to claim 18, wherein the post-processing unit is a perfect binder which binds a plurality of recording media with an adhesive, and the post-processing controller inhibits, in a case where an object of bookbinding by the perfect binder includes the recording medium on which the test image is formed, a bookbinding processing on the object.

21. The image forming apparatus according to claim 18, wherein the post-processing unit is a stapler, and the post-processing controller prohibits a staple processing of the post-processing unit on the recording medium on which the test image is formed.

22. The image forming apparatus according to claim 18, wherein the post processing unit is a staple device, and the post-processing controller inhibits a staple processing of the post-processing unit on a group of recording media including the recording medium on which the test image is formed.

23. The image forming apparatus according to claim 18, wherein the post-processing unit is a saddle stitch binder which binds a plurality of recording media by a staple-like member, and the post-processing controller inhibits a bookbinding processing on the recording medium on which the test image is formed.

24. The image forming apparatus according to claim 18, wherein the post-processing unit is a saddle stitch binder which binds a plurality of recording media by a staple-like member, and the post-processing controller inhibits, in a case where an object of bookbinding by the saddle stitch binder includes the recording medium on which the test image is formed, a bookbinding processing on the object.

25. The image forming apparatus according to claim 18, wherein the post-processing unit is a perfect binder which binds a plurality of recording media with an adhesive, and the post-processing controller inhibits a bookbinding processing on the recording medium on which the test image is formed.

* * * * *